Aug. 20, 1957 G. E. SMITHBURN 2,803,183
SELF-PROPELLED GARDEN CULTIVATOR
Filed Jan. 30, 1956 3 Sheets-Sheet 1

INVENTOR.
George E. Smithburn
BY Manfred M Warren
His Attorney

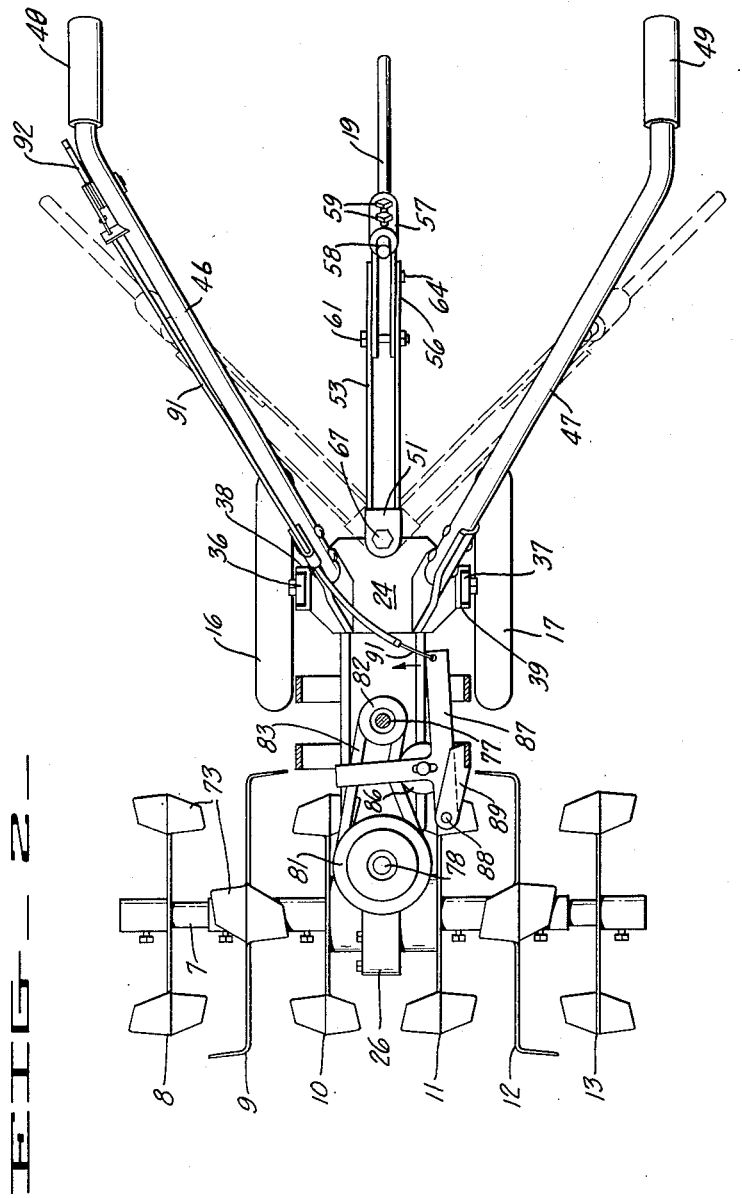

Aug. 20, 1957  G. E. SMITHBURN  2,803,183
SELF-PROPELLED GARDEN CULTIVATOR
Filed Jan. 30, 1956  3 Sheets-Sheet 3
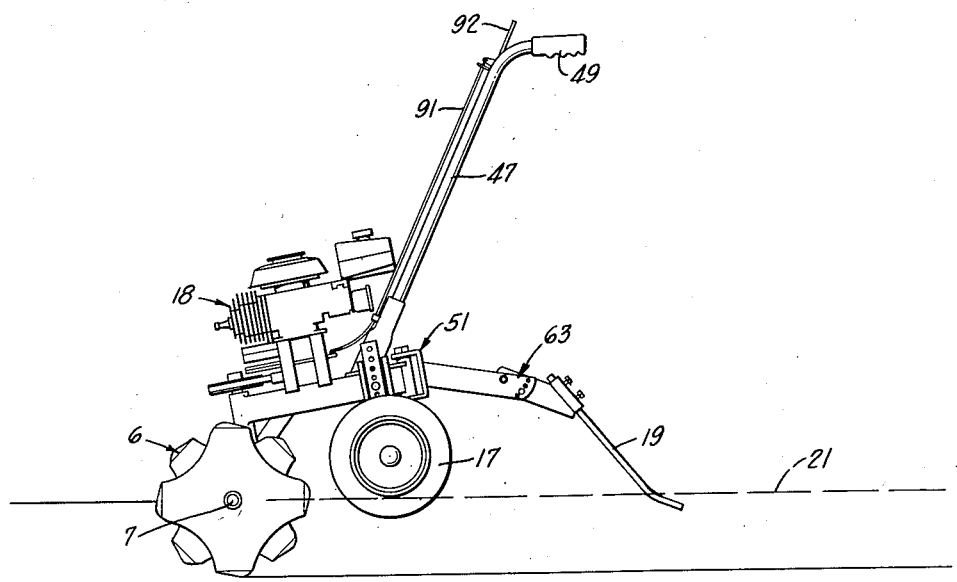
FIG_3_
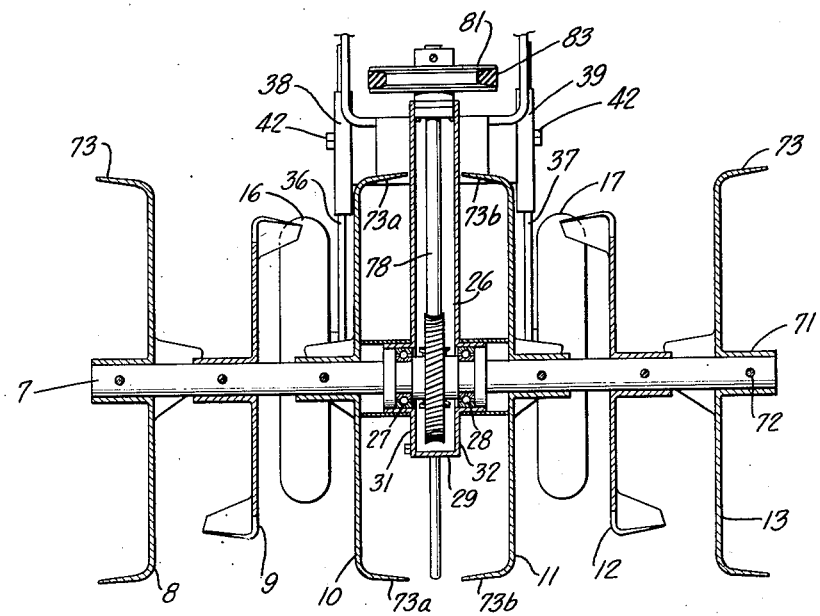
FIG_4_
INVENTOR.
George E. Smithburn.

United States Patent Office 2,803,183
Patented Aug. 20, 1957

2,803,183

SELF-PROPELLED GARDEN CULTIVATOR

George E. Smithburn, Berkeley, Calif.

Application January 30, 1956, Serial No. 562,310

10 Claims. (Cl. 97—40)

The invention relates to ground tilling equipment and more particularly to garden cultivators sometimes referred to as the walking type and of the general character disclosed in my co-pending application Serial No. 426,079, filed April 28, 1954, for Garden Cultivator.

An object of the present invention is to provide a cultivator of the character described which will afford an automatic self-adjusting control of the depth of tillage and which may be easily and rapidly set to maintain a desired depth of tillage within the range normally used for garden cultivation.

Another object of the present invention is to provide a cultivator of the character above which may be easily and readily controlled in its direction and rate of forward progress and which may be generally handled, manipulated and operated with a minimum of physical effort and attention.

A further object of the present invention is to provide a cultivator of the character described which is both of a relatively light weight and readily portable nature yet of durable and rugged construction capable of giving long, efficient and trouble-free use.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 2 is a plan view partly in cross-section as indicated by line 2—2 of Figure 1.

Figure 3 is a side elevation similar to Figure 1 but on a reduced scale and showing the cultivator in one of its operative positions.

Figure 4 is a cross-sectional view on a somewhat enlarged scale of a portion of the cultivator indicated by the plane of line 4—4 in Figure 1.

Figure 1:
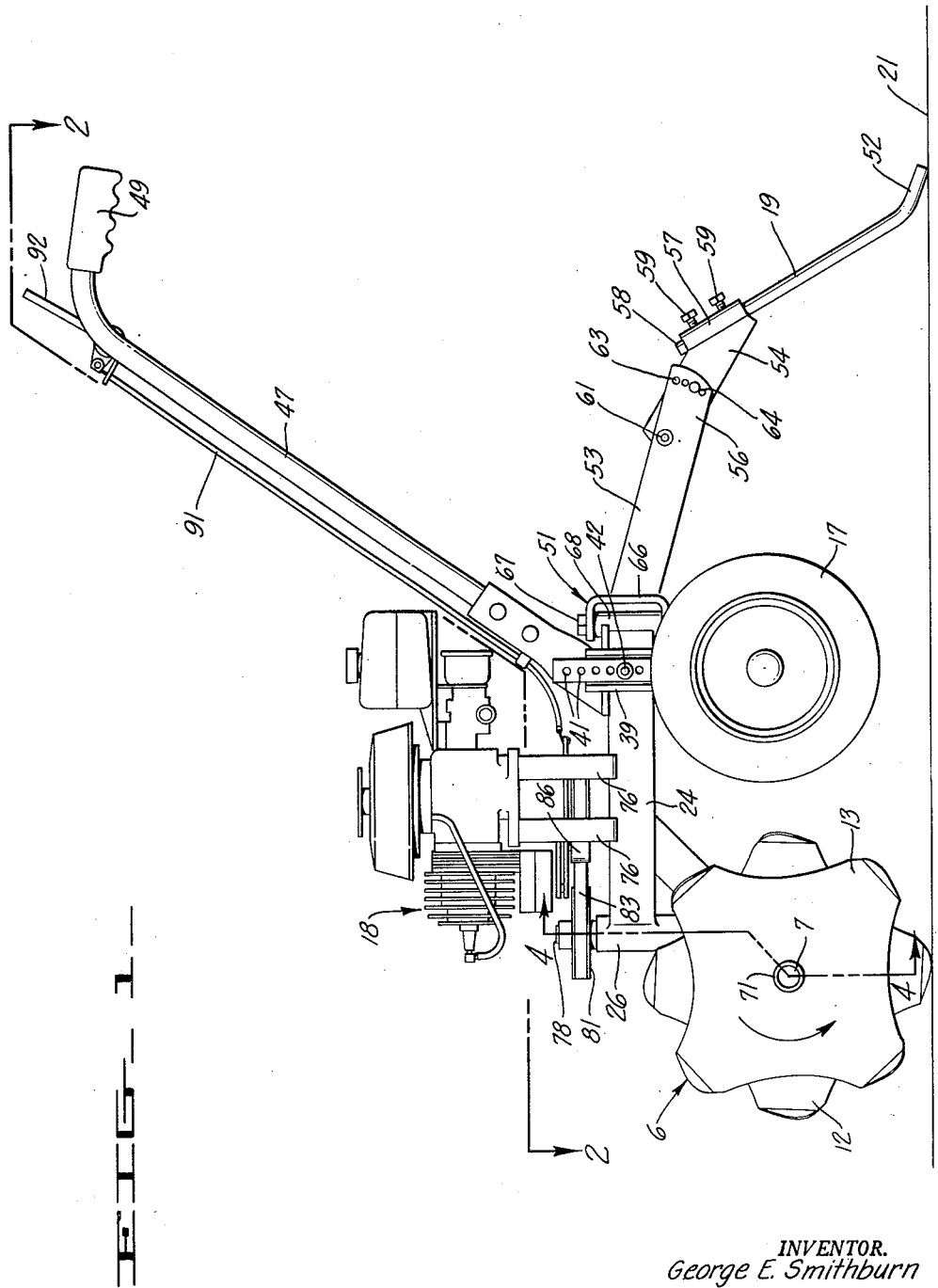
Figure 1 is a side elevation of a garden cultivator constructed in accordance with the present invention.

The cultivator of the present invention consists briefly of a ground tilling mill 6 comprosed of a horizontal shaft 7 journaled for rotation and tines 8, 9, 10, 11, 12 and 13 mounted thereon, one or more ground engaging wheels 16 and 17 mounted rearwardly of the mill 6, a gasoline engine 18 mounted in a fore and aft position between the mill 6 and the wheels 16 and 17 and which is connected to the shaft 7 for effecting rotation of the mills, and a drag stake 19 mounted rearwardly of the wheels 16 and 17 and providing with the mill an initial support for the cultivator with the wheels carried in spaced relation to the ground as indicated by line 21 in Figure 1, the mill being designed to provide downward digging until the wheels 16 and 17 touch the ground to afford a rolling support for the cultivator. At such a time the unit will move forwardly causing the mill 6 to climb out of its partially submerged position in the ground, thus elevating the front end of the cultivator to again raise the wheels from the ground and transfer the support to the stake 19 which again holds the unit against forward movement while the mill digs downwardly at its forwardly moved position. There is thus provided a cyclic type of operation which affords an automatic self-control of the depth of tillage as the cultivator moves periodically into the ground and forwardly in its operation.

As here shown the several parts of the cultivator are unitarily assembled on a generally horizontally extending frame 24. A vertically depending drive case 26 is secured to the forward end of frame 24 and provides horizontally aligned bearings 27 and 28 adjacent its lower end 29 for journalling the mill shaft 7 which extends transversely through the case and from the opposite sides 31 and 32 thereof. The wheels 16 and 17 are individually mounted at the lower ends of vertically extending arms 36 and 37 which extend upwardly through channel shaped guides 38 and 39 fastened to the rear of the frame 24. As will be best seen in Figure 1, the arms 36 and 37 are provided with a series of spaced openings 41 for receiving a fastening bolt 42 carried by the guides 38 and 39. By selecting the opening 41 in each of the arms 36 and 37 to engage with the fastening bolt 42, the relative height of the wheels 16 and 17 may be individually adjusted to the contour of the ground and to aid in controlling the depth of tillage as above described. As will be observed in Figures 2 and 4, the wheels 16 and 17 are mounted in equally spaced relation on opposite sides of the vertical longitudinal center plane of the cultivator and on opposite sides of the drive case 26 which is positioned in this center plane. A pair of handles 46 and 47 extend rearwardly and upwardly from the frame adjacent the guides 38 and 39 and may be fitted with hand grips 48 and 49 at their outer laterally spaced-apart ends for convenient manual engagement by the operator who will normally stand and walk behind the cultivator.

In accordance with the present invention and as an important feature thereof the ground stake 19 is vertically adjustable so as to control the depth of tillage of the mill, and also the support for the stake includes a swivel joint 51 located forwardly and upwardly from the lower ground engaging end 52 of the stake, thus permitting the stake to swing about a vertical axis in trailing relation to the forward movement of the cultivator. Also preferably means is provided for adjustment of the vertical angle of the stake so as to control its braking action on the forward movement of the cultivator. As here shown an arm 53 is pivoted to the frame adjacent its rearward end and at the center plane and about a vertical axis so as to provide the swivel 51. The arm 53 extends reardwardly from the swivel 51 and preferably slightly downwardly. A bracket 54 is carried by the rear end 56 of the arm and is in turn formed with a tubular socket 57 for receiving the upper end portion 58 of the drag stake. Set screws 59 may be used for securing the drag stake in adjusted position within the socket. As here shown bracket 54 is pivoted to arm 53 about a horizontal axis as provided by a pivot pin 61 so as to permit the bracket 54 and the ground stake 19 to swing about the axis of pin 61 to set both the effective vertical length of the drag stake as well as its vertical angle. As here shown the outer end portion 56 of arm 53 is formed with a series of openings 63 which may be selectively aligned with an opening in bracket 54 for receipt of a locking pin 64 by means of which the bracket may be held in a selected rotated position about pivot pin 61. As here shown the swivel 51 is formed by a clevis 66 fastened at the forward end of arm 53 and which is held by a vertical kingpin 67 extended through aligned openings in the clevis and a vertical bearing 68 secured to the frame 24. The clevis may be inverted so as to give an upward inclination of the arm where such an adjustment may be desired.

Another important feature of the present invention and contributing measurably to the automatic operation above discussed is the form and arrangement of the tines 8–13 which afford downward digging by the mill without interference by the drive case 26 and more particularly the lower end 29 thereof. As here shown the tines are of plate form, each having a central hub or boss 71 of sleeve-like form mounted over the shaft 7 and secured thereto by a shear pin 72. At the periphery of the plates are a plurality of circumferentially spaced, offset, hoe-like end portions 73 which project substantially perpendicularly from the planes of the plates, as best seen in Figures 2 and 4. As an important feature, a pair of tines, here tines 10 and 11, are positioned on the opposite sides of the drive case 26 adjacent to the case and are arranged with certain of their offset hoe-like end portions 73a and 73b extending towards each other and towards the case so as to cooperatively define a scoop for removing earth from under the case during operative rotation of the mill so as to permit downward digging by the mill into the earth without interference by the case. As will be best seen in Figure 4, the inturned end portions 73a and 73b extend towards each other and quite close to the opposite sides 31 and 32 of the drive case so that as the tines 10 and 11 jointly rotate the end portions 73a and 73b come around together and at a minimum spacing from each other to constantly clear out the earth from under the case 26 thereby permitting the mill to go as deeply into the ground as desired by the operator. Normally the mill will be submerged into the earth being tilled to about the level of shaft 7 as indicated in Figure 3.

I have found that the depth of tillage and the forward movement of the cultivator may be manually controlled by raising or lowering the handles 46 and 47. Pressing down on the handles retards or prevents forward motion while raising of the handles produces forward movement. It is believed that the latter function is related to a shifting of the center of gravity of the cultivator to a location more closely positioned over the mill which throws more weight onto the mill and also affects the angle of attack of the mill in the ground. In the present cultivator, the position of the center of gravity is determined in a large measure by the positioning of the gasoline engine 18. As above noted this engine is located fore and aft between the mill shaft 7 and the wheels 16 and 17 and on a line extending upwardly and rearwardly from the shaft 7 at an acute angle to horizontal. It may be demonstrated that the forward propelling force of the mill increases with an increase of this angle. It will be noted that this angle is increased by the downward digging of the mill into the ground which is accompanied by a forward tipping of the cultivator, as illustrated in Figure 3 of the drawings. Consequently the mill will initially dig downwardly until this angle has increased to the point where forward movement is induced and as above noted the form and arrangement of the tines will enable such downward digging of the mill without interference or limitation until the mill is substantially submerged. If desired the vertical adjustment of the wheels 16 and 17 may be used to set the angle of center of gravity to a point below that at which forward movement takes place. This will depend on the type of soil being tilled and of course upon the contour of the ground. Under certain circumstances it is possible to obtain the automatic digging action above without the drag stake and by the proper elevation of the wheels. In such a case the downward digging of the mill and the forward tilting of the center of gravity induces forward movements and a balance or sort of equilibrium is reached in the depth of tillage action and rate of forward movement, it being understood in such case that forward movement raises the mill and thereby retards further forward movement while digging takes place, and digging induces forward motion as above explained.

The gasoline engine 18 is mounted in spaced superimposed relation to the frame 24 and to the upper end of the drive case 26 upon vertically extending frame arms 76. As here shown, the engine is mounted in the central plane of the unit and is provided with a vertically set output shaft 77 (see Figure 2). A vertical drive shaft 78 is mounted in the drive case 26 and is fitted at its upper end with a belt sheave 81 arranged generally in the same plane as a belt sheave 82 provided on the lower end of the engine shaft 77. A belt 83 is entrained around the sheaves 81 and 82 so as to provide an operative connection between the engine shaft 77 and the drive shaft 78. Preferably means is provided for clutching and declutching this operative connection and, as here shown, a belt tensioning roller 86 is mounted for movement to and from one run of the belt, as illustrated in Figure 2, so as to control the driving connection between the sheaves 81 and 82. The roller 86 is here mounted on a lever 87 pivoted at its forward end by pin 88 to a frame bracket 89 so as to swing horizontally to and from the belt 83. An operating cable 91 is connected to the rear free end of lever 87 and extends upwardly to a manually engageable lever 92 carried at the upper extremity of handle 46. Lever 92 is here shown disposed for convenient thumb operation by the right hand of the operator so as to clutch the drive connection when depressed and to declutch such a connection when raised.

The operation of the cultivator is generally depicted in Figures 1 and 3 of the drawings. Initially the drag stake and wheels will be adjusted so as to support the unit on the stake 19, as illustrated in Figure 1, with the wheels 16 and 17 raised off of the ground. In this position the braking power of the ground stake 19 functioning cooperatively with the rearwardly and downwardly swung position of the center of gravity of the unit will hold the cultivator against forward movement. The clutch lever 92 is swung to engage the drive to the mill and the tines will rotate to produce digging action. No forward motion occurs until the mill has dug to the depth for which the drag stake is set. The wheels 16 and 17 will sink into the soft tilled ground, as indicated in Figure 3, as they assume the support for the cultivator. As the mill digs into the ground, the cultivator tips forwardly, as illustrated in Figure 3, and the wheels 16 and 17 are lowered to the ground and take over the support from the drag stake 19. As this occurs the cultivator will move forwardly a few inches until the weight is taken off of the wheels and again transferred to the drag stake 19 which brakes further forward motion. The mill digs down again and this action repeats itself as long as the unit is working.

I claim:

1. A cultivator comprising, a ground tilling mill composed of a horizontal shaft journalled for rotation and tines mounted thereon, a ground engaging wheel mounted rearwardly of said mill, a gasoline engine mounted between said mill and wheel and locating the center of gravity of said cultivator between said shaft and wheel and connected to said shaft, and a ground engaging drag stake mounted rearwardly of said wheel and having a lower end spaced rearwardly from said wheel with said lower end providing with said mill an initial support for said cultivator with said wheel carried in spaced relation to the ground, said mill being designed to provide downward digging until said wheel touches the ground to thus afford a rolling support for said cultivator.

2. A cultivator as characterized in claim 1 wherein said stake is vertically adjustable to control the depth of tillage of said mill.

3. A cultivator as characterized in claim 1 wherein said stake is vertically adjustable to control the depth of tillage of said mill and is provided with a support including a swivel joint located forwardly and upwardly from the lower ground engaging end of said stake permitting said stake to swing about a vertical axis in trailing relation to the forward movement of the cultivator and wherein the vertical angle of said stake is adjustable to control its braking action on said forward movement.

4. A cultivator as characterized in claim 1 wherein said mill includes a drive case journaling said shaft with said shaft extending transversely from the opposite sides of said case, and a pair of said tines being positioned on opposite sides of and adjacent to said case and being formed with offset hoe-like end portions extending toward each other and towards said case and cooperating to define a scoop for removing earth from under said case during operative rotation of said shaft to permit downward digging by said mill into the earth without interference by said case.

5. A cultivator comprising, a frame, a drive case mounted on and depending from said frame, a ground tilling mill composed of a shaft jaurnalled by said case and extended transversely from the opposite sides thereof and tines carried by said shaft, a ground engaging wheel carried by and depending from said frame rearwardly of said shaft, a gasoline engine connected to said shaft and mounted on said frame between said shaft and wheel and locating the center of gravity of said cultivator between said shaft and wheel and on a line extending upwardly and rearwardly from said shaft at an acute angle to horizontal, the forward propelling force of said mill increasing with an increase of said angle, a pair of said tines being positioned on opposite sides of and adjacent to said case and being formed with offset hoe-like end portions extending towards each other and towards said case and cooperating to define a scoop for removing earth from under said case during operative rotation of said shaft to permit downward digging by said mill into the earth without interference by said case, and a ground-engaging drag stake mounted rearwardly of said wheel and having a lower end spaced rearwardly from said wheel with said lower end providing with said mill an initial support for said cultivator with said wheel carried in spaced relation to the ground, said downward digging of said mill functioning to increase said angle and to lower said wheel to the ground to thus afford a rolling support for said cultivator.

6. A cultivator comprising, a frame, a drive case mounted on and depending from said frame, a ground tilling mill composed of a shaft journalled by said case and extended transversely from the opposite sides thereof and tines carried by said shaft, a ground engaging wheel carried by and depending from said frame rearwardly of said shaft, a gasoline engine mounted on said frame between said shaft and wheel and locating the center of gravity of said cultivator between said shaft and wheel, drive means connecting said engine and shaft, and a ground engaging drag stake carried by said frame and depending therefrom rearwardly of said wheel and having a lower end spaced rearwardly from said wheel and providing with said mill an initial support for said frame with said wheel carried in spaced relation from the ground, a pair of said tines being positioned on opposite sides of and adjacent to said case and being formed with offset hoe-like end portions extending toward each other and towards said case and cooperating to define a scoop for removing earth from under said case during operative rotation of said shaft to cause downward digging by said mill into the earth without interference by said case and until said wheel touches the ground and provides a rolling support for said cultivator.

7. A cultivator comprising, a frame, a gasoline engine mounted on said frame, a drive case mounted on said frame and depending therefrom in advance of said engine, a tiller shaft journalled by and extending from the opposite sides of said case, drive means in said case connecting said engine and shaft, tines carried by and extending from said shaft for tilling the ground, the center of gravity of said cultivator being located on a line extending upwardly and rearwardly from said shaft at an acute angle to horizontal, said cultivator during rotation of said shaft responding to an increase of said angle in forward motion and to a decrease in said angle in downward digging by said tines, and a ground engaging wheel carried by said frame rearwardly of said center of gravity and adjustable vertically to set said angle, a ground-engaging drag stake mounted rearwardly of said wheel and having a lower end spaced rearwardly from said wheel with said lower end providing with said tines an initial support for said cultivator with said wheel carried in spaced relation to the ground, a pair of said tines being positioned on opposite sides of and adjacent to said case and being formed with offset hoe-like outer end portions which extend towards each other and towards said case and function cooperatively to scoop out the earth from under said case to permit downward digging by said tines without interference by said case until the increase of said angle and the lowering of said wheel to the ground induces forward movement.

8. A cultivator comprising, a frame, a drive case carried by and depending therefrom on a vertical longitudinal center plane of said cultivator, a ground tilling mill including a shaft journalled by and extending transversely from the opposite sides of said case and tines carried by said shaft, a pair of ground engaging wheels mounted for vertical adjustment on said frame rearwardly of said shaft and on opposite sides of said plane, a gasoline engine mounted on said frame in said plane between said shaft and wheels and locating the center of gravity of said cultivator between said shaft and wheels, a pair of handles extending rearwardly and upwardly from said frame on opposite sides of said plane for manual engagement, an arm pivoted to said frame at said plane and about a vertical axis and extending rearwardly from said frame, a bracket pivoted to said arm about a horizontal axis, means fixing the relative position of said bracket and arm, and a drag stake carried by said bracket and depending therefrom with the lower end of said drag stake spaced rearwardly from said wheels so as to provide with said mill an initial support for said cultivator with said wheels carried in spaced relation to the ground, said tines being designed upon rotation of said shaft to effect downward digging until said wheels engage the ground.

9. A cultivator comprising, a frame, a drive case carried by and depending therefrom on a vertical longitudinal center plane of said cultivator, a ground tilling mill including a shaft journaled by and extending transversely from the opposite sides of said case and tines carried by said shaft, a vertical drive shaft in said case connected at its lower end to said mill shaft, a pair of ground engaging wheels mounted for vertical adjustment on said frame rearwardly of said mill shaft and on opposite sides of said plane, a gasoline engine mounted on said frame in said plane between said mill shaft and wheels and having a vertical output shaft, belt sheaves mounted on the upper end of said drive shaft and the lower end of said engine shaft, a belt connecting said sheaves, a belt tensioning roller mounted for movement to and from one run of said belt to control the driving connection between said sheaves, a pair of handles extending rearwardly and upwardly from said frame on opposite sides of said plane for manual engagement, manually engageable means carried by one of said handles for displacing said roller, an arm extending rearwardly from said frame, a bracket carried by said arm, and a drag stake carried by said bracket and depending therefrom to provide with said mill an initial support for said cultivator with said wheels carried in spaced relation to the ground, said tines being designed upon rotation of said mill shaft to effect downward digging until said wheels engage the ground, said arm being pivoted to said frame about a vertical axis to permit said stake to swing from side to side in trailing relation to the forward movement of said cultivator and said bracket being pivoted to said arm about a horizontal axis to provide for vertical adjustment of said stake to control the depth of tillage of said mill.

10. A cultivator comprising, a ground tilling mill composed of a horizontal rotary shaft and tines mounted thereon, a ground engaging wheel mounted rearwardly of said mill, a gasoline engine mounted approximately midway between said mill and wheel and connected to said shaft and locating the center of gravity of said cultivator between said shaft and wheel and on a line extending upwardly and rearwardly from said shaft at an acute angle to horizontal, said mill being formed to produce a forward propelling force proportional to said angle, and a ground engaging drag stake mounted rearwardly of said wheel and having a lower end spaced rearwardly from said wheel with said lower end providing with said mill an initial support for said cultivator with said wheel carried in spaced relation to the ground, the ensuing digging action of said mill functioning to increase said angle and to lower said wheel to the ground to afford a rolling support for said cultivator thereby inducing forward movement and an elevation of said mill again returning the support to said drag stake.

References Cited in the file of this patent
UNITED STATES PATENTS

| | | |
|---|---|---|
| 1,751,694 | Glasier | Mar. 25, 1930 |
| 2,438,189 | Seaman | Mar. 23, 1948 |

FOREIGN PATENTS

| | | |
|---|---|---|
| 536,741 | Great Britain | May 26, 1941 |